(12) United States Patent
Yen

(10) Patent No.: US 12,504,621 B2
(45) Date of Patent: Dec. 23, 2025

(54) WHEEL OF PROJECTOR HAVING DAMPER

(71) Applicant: Coretronic Corporation, Hsin-Chu (TW)

(72) Inventor: Chun-Lung Yen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 694 days.

(21) Appl. No.: 17/719,375

(22) Filed: Apr. 13, 2022

(65) Prior Publication Data

US 2022/0326506 A1 Oct. 13, 2022

Related U.S. Application Data

(60) Provisional application No. 63/174,521, filed on Apr. 13, 2021.

(30) Foreign Application Priority Data

Jun. 8, 2021 (CN) .......................... 202121268909.7

(51) Int. Cl.
*G02B 26/00* (2006.01)
*G03B 21/26* (2006.01)
*H04N 9/31* (2006.01)

(52) U.S. Cl.
CPC .......... *G02B 26/008* (2013.01); *G03B 21/26* (2013.01); *H04N 9/3114* (2013.01)

(58) Field of Classification Search
CPC ..... G02B 26/008; G03B 21/26; H04N 9/3114

USPC .......................................................... 353/54
See application file for complete search history.

(56) References Cited

U.S. PATENT DOCUMENTS

| 10,698,305 B2 | 6/2020 | Lin et al. | |
|---|---|---|---|
| 2004/0145707 A1* | 7/2004 | Lee | G03B 21/28 348/E5.143 |
| 2004/0145823 A1* | 7/2004 | Jiang | G02B 26/008 359/891 |
| 2016/0070095 A1* | 3/2016 | Hsu | G03B 21/145 353/31 |

FOREIGN PATENT DOCUMENTS

| CN | 205003431 | 1/2016 | |
|---|---|---|---|
| CN | 211014989 | 7/2020 | |
| KR | 200342881 Y1 * | 2/2004 | ........... G02B 26/008 |
| TW | 201610548 | 3/2016 | |

* cited by examiner

*Primary Examiner* — Magda Cruz
(74) *Attorney, Agent, or Firm* — JCIPRNET

(57) ABSTRACT

A wheel including a substrate, a driving assembly, a fixing bracket, and a damper is provided. The driving assembly is disposed on the substrate to drive the substrate to rotate. The driving assembly and the damper are fixed onto the fixing bracket. The damper is disposed between the driving assembly and the fixing bracket, and the driving assembly is located between the substrate and the damper. The driving assembly has a first diameter, the damper has a second diameter, and the second diameter is greater than or equal to the first diameter. The wheel is disposed in a projector and may effectively reduce vibration and noise generated during the operation of the wheel, so as to mitigate a noise problem of the projector and increase a service life of the wheel.

17 Claims, 21 Drawing Sheets

WHEEL OF PROJECTOR HAVING DAMPER

CROSS-REFERENCE TO RELATED APPLICATION

This application claims the priority benefit of U.S. provisional application Ser. No. 63/174,521, filed on Apr. 13, 2021 and China application serial no. 202121268909.7, filed on Jun. 8, 2021. The entirety of each of the above-mentioned patent applications is hereby incorporated by reference herein and made a part of this specification.

BACKGROUND

Technical Field

The invention relates to a wheel, and particularly relates to a wheel capable of effectively reducing vibration and noise generated during operation and reducing a temperature.

Description of Related Art

A wheel is one of important components of a projector, which is, for example, a phosphor wheel, a color filter wheel, a diffusing wheel, or the like. Regardless of the type of the wheel, during a rotation process, as a weight and a speed of the wheel increase, vibration is inevitably induced, and temperature of the wheel is raised. The vibration of the wheel includes axial vibration along a rotation axis and radial vibration along a direction of a rotating centrifugal force. The vibration of the wheel may be transmitted to other positions in the projector through mechanical components, which causes other mechanical components to produce noise, thereby causing a noise problem of the projector. In order to reduce a transmission amount of the vibration of the wheel, a weight of a wheel bracket may be increased. However, as a rotation speed of the wheel increases, the weight of the wheel bracket also needs to increase, which leads to an increase in a weight and a volume of the projector.

In addition, as the weight and heat of the wheel increase, a temperature of a driving assembly (a motor) is also increased. In order to reduce the temperature of the driving assembly, a fan is generally used to lower down the temperature of the driving assembly. When the temperature of the driving assembly rises significantly, a fan with a relatively large flow rate must be applied, which result in the increase in the noise and the volume of the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a wheel, which is adapted to effectively reduce vibration and noise generated during an operation of the wheel, thereby mitigating a noise problem of a projector and increasing a service life of the wheel.

In order to achieve one or a portion of or all of the objects or other objects, an embodiment of the invention provides a wheel including a substrate, a driving assembly, a fixing bracket and a damper. The driving assembly is disposed on the substrate to drive the substrate to rotate. The driving assembly and the damper are fixed onto the fixing bracket. The damper is disposed between the driving assembly and the fixing bracket, and the driving assembly is located between the substrate and the damper. The driving assembly has a first diameter, the damper has a second diameter, and the second diameter is greater than or equal to the first diameter.

Based on the above description, one or more embodiments of the invention have at least one of following advantages or effects. In the design of the wheel provided in one or more embodiments of the invention, the driving assembly and the damper are fixed onto the fixing bracket, and the damper is disposed between the driving assembly and the fixing bracket to reduce an amount of vibration transmitted to the fixing bracket, so as to effectively reduce the noise of the wheel during operation, mitigate an overall noise problem of the projector, and increase the service life of the wheel.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
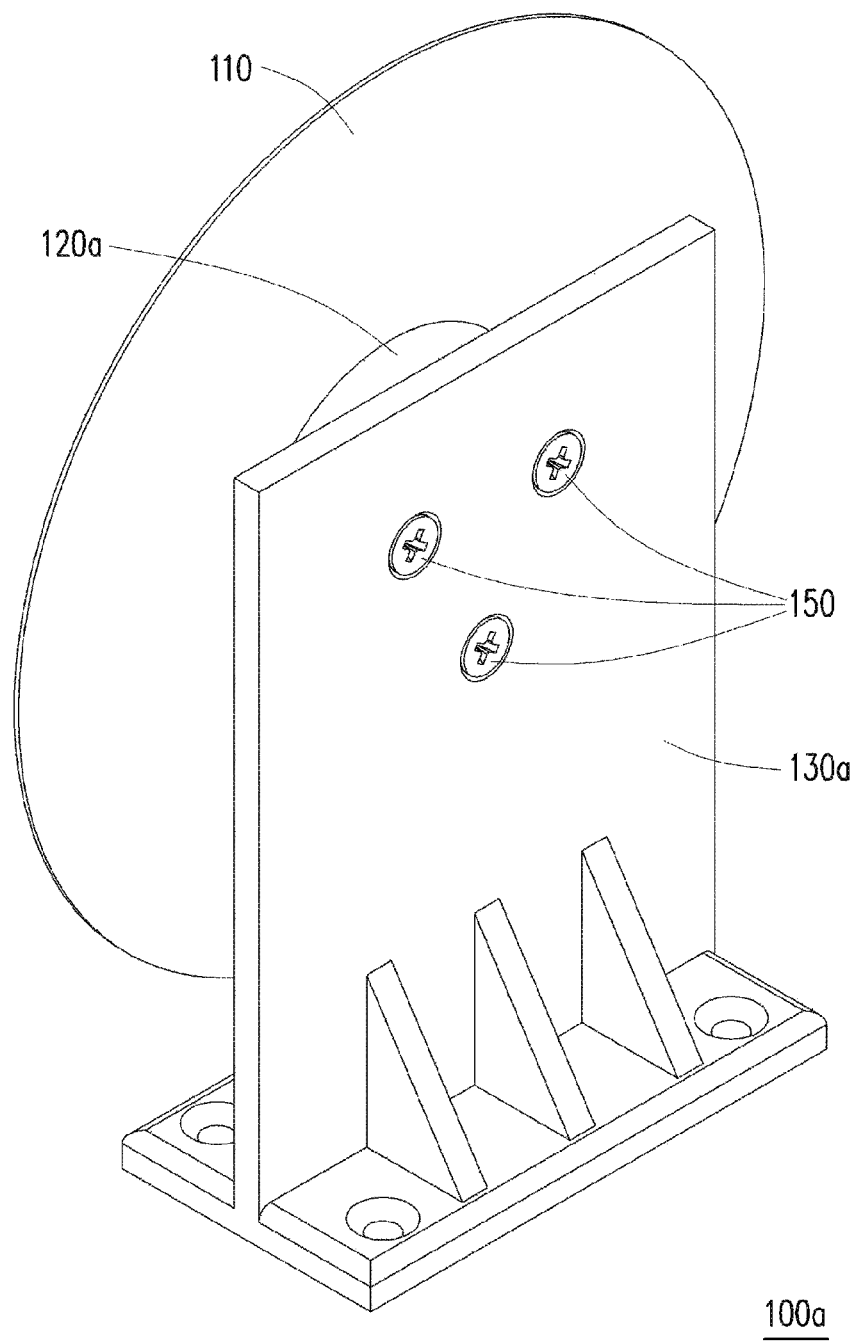
FIG. 1A is a schematic three-dimensional view of a wheel according to an embodiment of the invention.
Figure 1B:
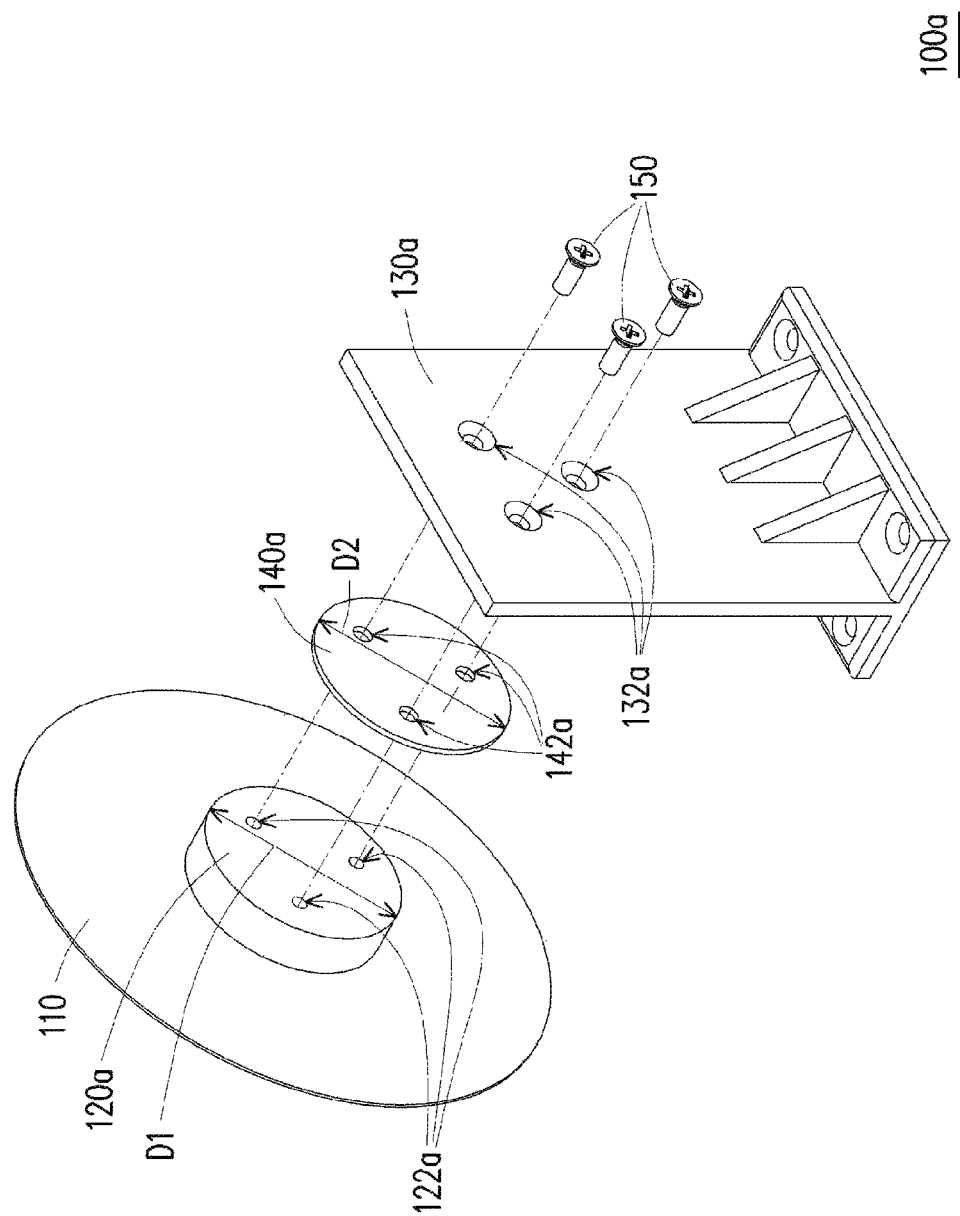
FIG. 1B is a schematic three-dimensional exploded view of the wheel of FIG. 1A.
Figure 1C:
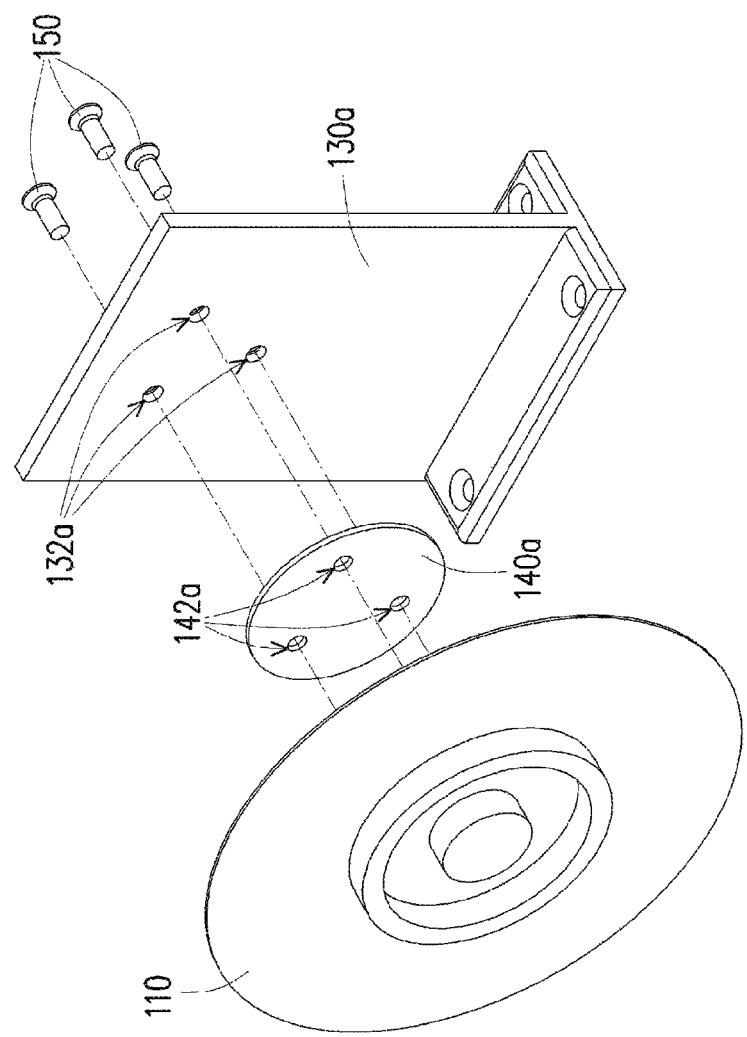
FIG. 1C is a schematic three-dimensional exploded view of the wheel of FIG. 1A from another perspective.
Figure 1D:
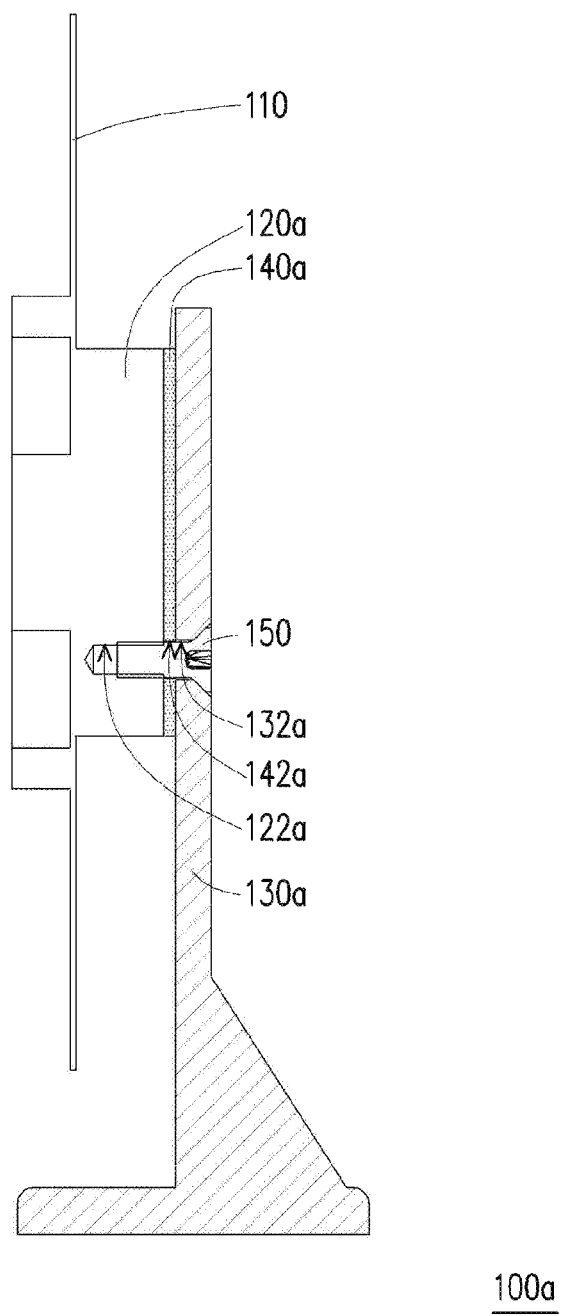
FIG. 1D is a schematic cross-sectional view of the wheel of FIG. 1A.

FIG. 1A is a schematic three-dimensional view of a wheel according to an embodiment of the invention. FIG. 1B is a schematic three-dimensional exploded view of the wheel of FIG. 1A. FIG. 1C is a schematic three-dimensional exploded view of the wheel of FIG. 1A from another perspective. FIG. 1D is a schematic cross-sectional view of the wheel of FIG. 1A. Referring to FIG. 1A, FIG. 1B, and FIG. 1C at the same time, in the embodiment, a wheel 100a includes a substrate 110, a driving assembly 120a, a fixing bracket 130a, and a damper 140a. The driving assembly 120a is disposed on the substrate 110 to drive the substrate 110 to rotate. The wheel 100a is arranged in a projector (not shown), and the fixing bracket 130a of the wheel 100a is fixed in the projector. The driving assembly 120a and the damper 140a are fixed onto the fixing bracket 130a. The damper 140a is disposed between the driving assembly 120a and the fixing bracket 130a, and the driving assembly 120a is located between the substrate 110 and the damper 140a. Specifically, an orthographic projection of the damper 140a on the substrate 110 overlaps with an orthographic projection of the driving assembly 120a on the substrate 110. The driving assembly 120a has a first diameter D1, and the damper 140a has a second diameter D2, and the second diameter D2 is greater than or equal to the first diameter D1.

In detail, in the embodiment, the substrate 110 is, for example, a phosphor wheel substrate, a filter color wheel substrate, or a diffusion wheel substrate, but the invention is not limited thereto. The driving assembly 120a is, for example, a motor, and the driving assembly 120a has a plurality of first thread holes 122a. A material of the damper 140a is, for example, rubber or non-metallic materials, such as mylar, polycarbonate (PC), polyvinyl chloride (PVC), or polystyrene (PS), or timber, thereby reducing an amount of vibration transmitted to the fixing bracket 130a, and mitigating the noise problem generated by the wheel in the projector. In addition, the damper 140a of the embodiment has a plurality of second thread holes 142a, where the second thread holes 142a respectively correspond to the first thread holes 122a of the driving assembly 120a. Moreover, the fixing bracket 130a of the embodiment has a plurality of thread holes 132a, where the thread holes 132a respectively correspond to the second thread holes 142a of the damper 140a and the first thread holes 122a of the driving assembly 120a.

Referring to FIG. 1A, FIG. 1B, FIG. 1C and FIG. 1D at the same time, the wheel 100a of the embodiment further includes a plurality of locking members 150, where the locking members 150 sequentially pass through the thread holes 132a, the second thread holes 142a, and the first thread holes 122a to fix the driving assembly 120a disposed on the substrate 110 and the damper 140a onto the fixing bracket 130a. Here, the locking members 150 are, for example, screws or bolts, but the invention is not limited thereto. In particular, in the embodiment, a thickness of the damper 140a has a constant value, i.e., a uniform thickness, and a shape of the damper 140a is embodied as a circle disk, but the invention is not limited thereto.

In brief, in the design of the wheel 100a of the embodiment, the driving assembly 120a and the damper 140a are fixed onto the fixing bracket 130a, where the damper 140a is disposed between the driving assembly 120a and the fixing bracket 130a, thereby reducing the amount of vibration transmitted to the fixing bracket 130a to effectively reduce the noise generated during the operation of the wheel 100a, and mitigate the overall noise of the projector and increase a service life of the wheel 100a.

It should be noticed that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 2A:
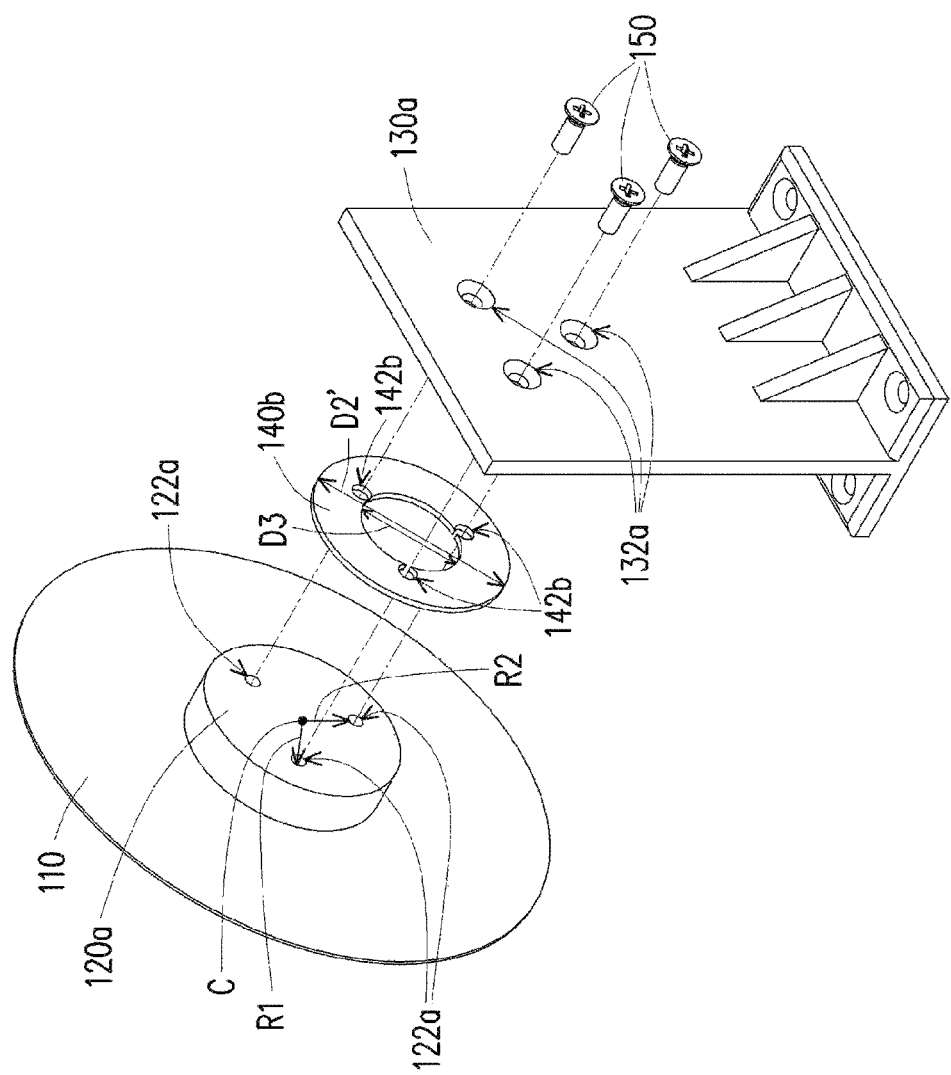
FIG. 2A is a schematic three-dimensional exploded view of a wheel according to another embodiment of the invention.
Figure 2B:
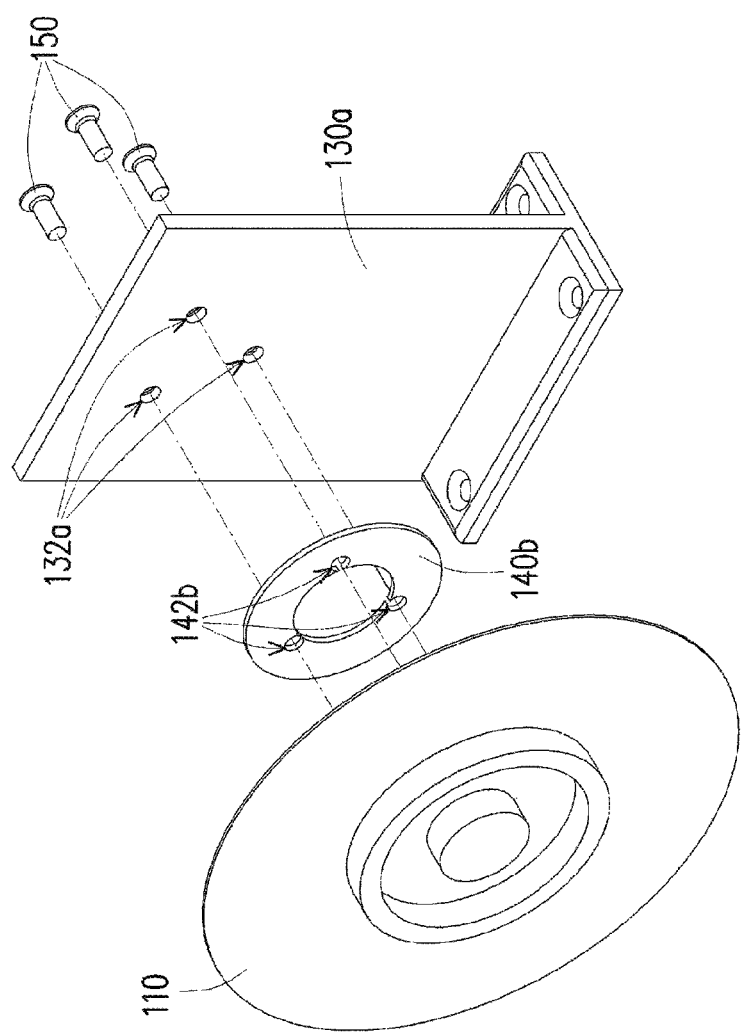
FIG. 2B is a schematic three-dimensional exploded view of the wheel of FIG. 2A from another perspective.
Figure 2C:
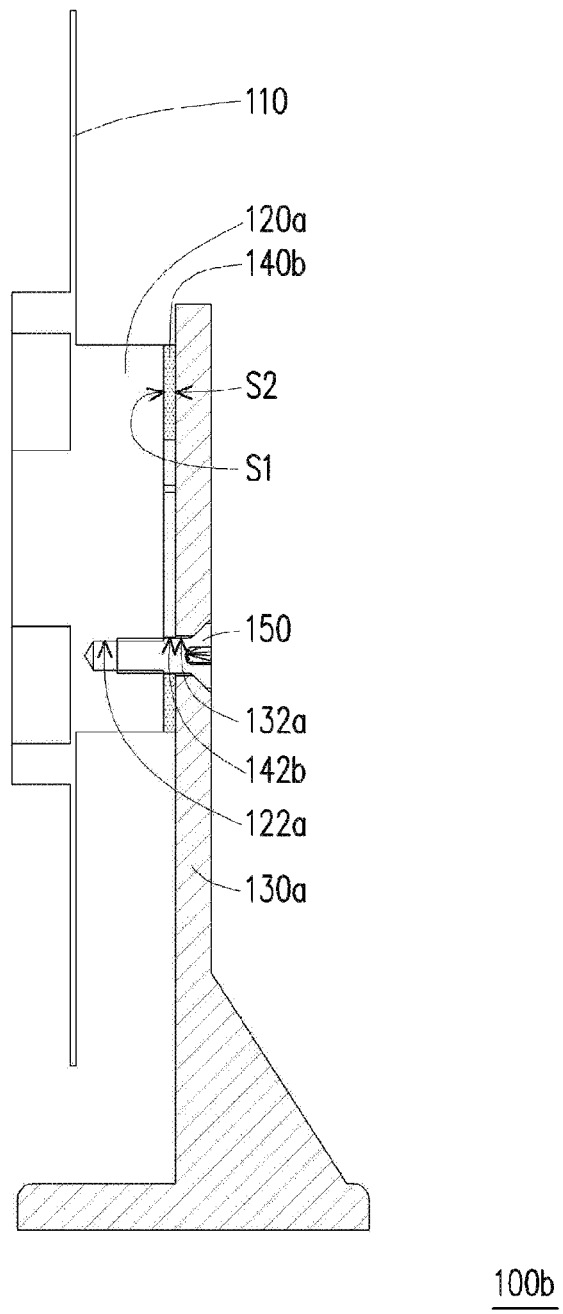
FIG. 2C is a schematic cross-sectional view of the wheel of FIG. 2A.

FIG. 2A is a schematic three-dimensional exploded view of a wheel according to another embodiment of the invention. FIG. 2B is a schematic three-dimensional exploded view of the wheel of FIG. 2A from another perspective. FIG. 2C is a schematic cross-sectional view of the wheel of FIG.

2A. Referring to FIG. 1B and FIG. 2A at the same time, a wheel 100b of the embodiment is similar to the wheel 100a of FIG. 1B, and a difference therebetween is that in the embodiment, a shape of a damper 140b of the wheel 100b is embodied as a ring shape, for example, a continuous ring shape, but the invention is not limited thereto. In another embodiment, the shape of the damper 140b may also be a discontinuous ring shape, which still belongs to the scope of the invention. In brief, the damper 140b may be an integral type or a segmental type ring-shape design according to actual requirements.

In detail, referring to FIG. 2A, FIG. 2B and FIG. 2C, the damper 140b has a plurality of second thread holes 142b, where the first thread hole 122a of the driving assembly 120a, the second thread hole 142b of the damper 140b, and the thread hole 132a of the fixing bracket 130a are correspondingly arranged. The locking members 150 pass through the thread holes 132a, the second thread holes 142b, and the first thread holes 122a in sequence to fix the driving assembly 120a on the substrate 110 and the damper 140b onto the fixing bracket 130a. Here, the driving assembly 120a has a center point C, where a longest distance R1 and a shortest distance R2 between an edge of each first thread hole 122a and the center point C are defined. The damper 140b has an inner diameter D3 and an outer diameter D2' (i.e., a second diameter). In particular, the inner diameter D3 of the damper 140b is preferably greater than or equal to the shortest distance R2, and the outer diameter D2' of the damper 140b is preferably greater than or equal to the longest distance R1. In addition, as shown in FIG. 2C, a first contact surface S1 of the driving assembly 120a and the damper 140b of the embodiment is parallel to a second contact surface S2 of the damper 140b and the fixing bracket 130a.

Figure 3A:
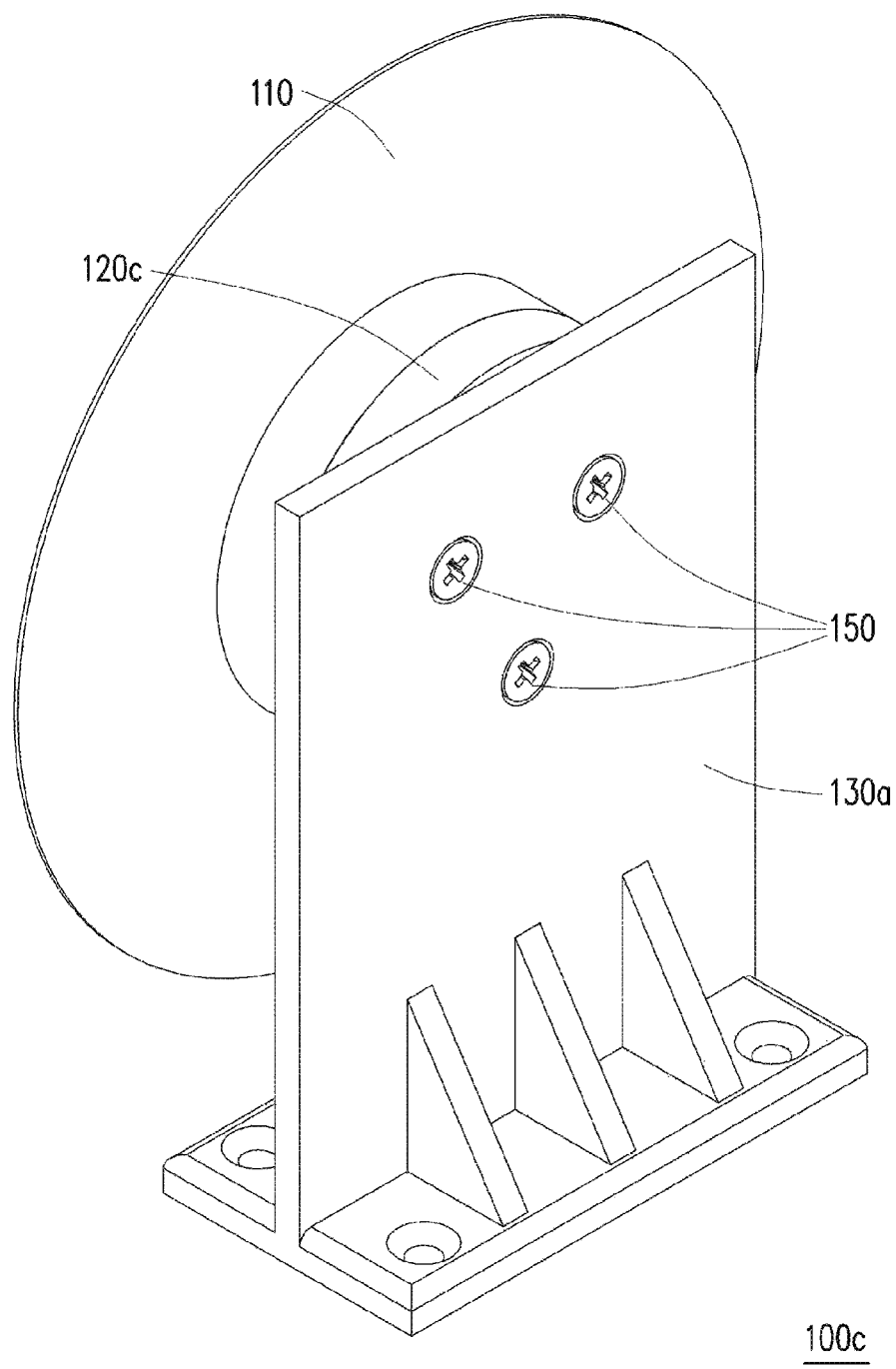
FIG. 3A is a schematic three-dimensional view of a wheel according to another embodiment of the invention.
Figure 3B:
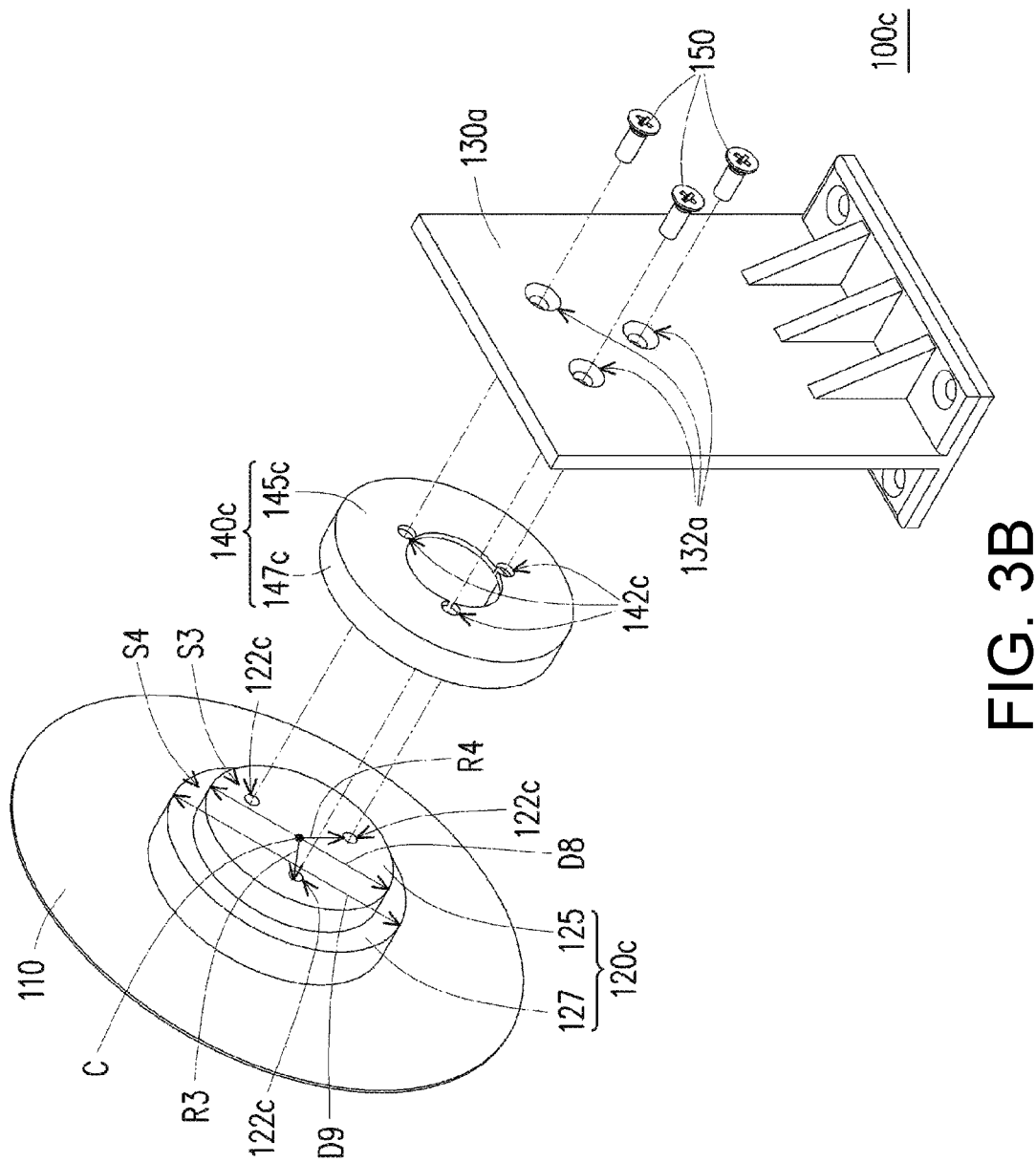
FIG. 3B is a schematic three-dimensional exploded view of the wheel of FIG. 3A.
Figure 3C:
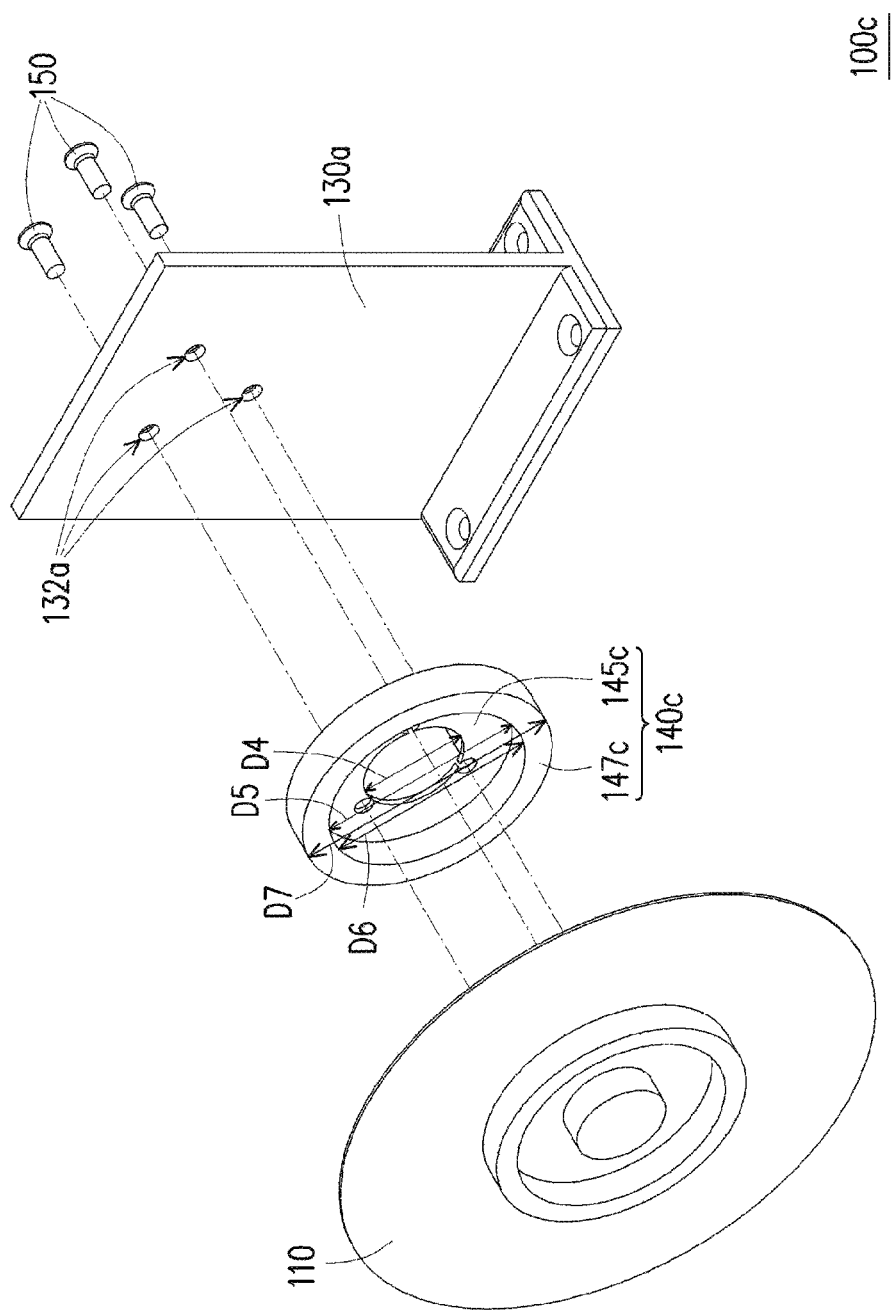
FIG. 3C is a schematic three-dimensional exploded view of the wheel of FIG. 3A from another perspective.
Figure 3D:
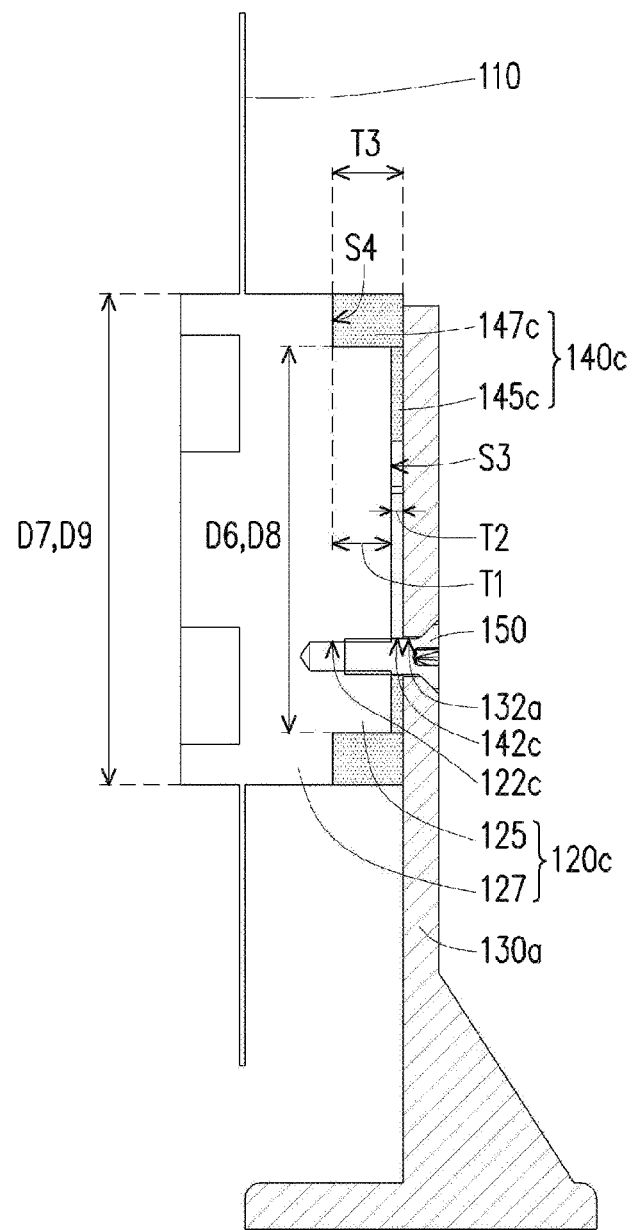
FIG. 3D is a schematic cross-sectional view of the wheel of FIG. 3A.
Figure 3E:
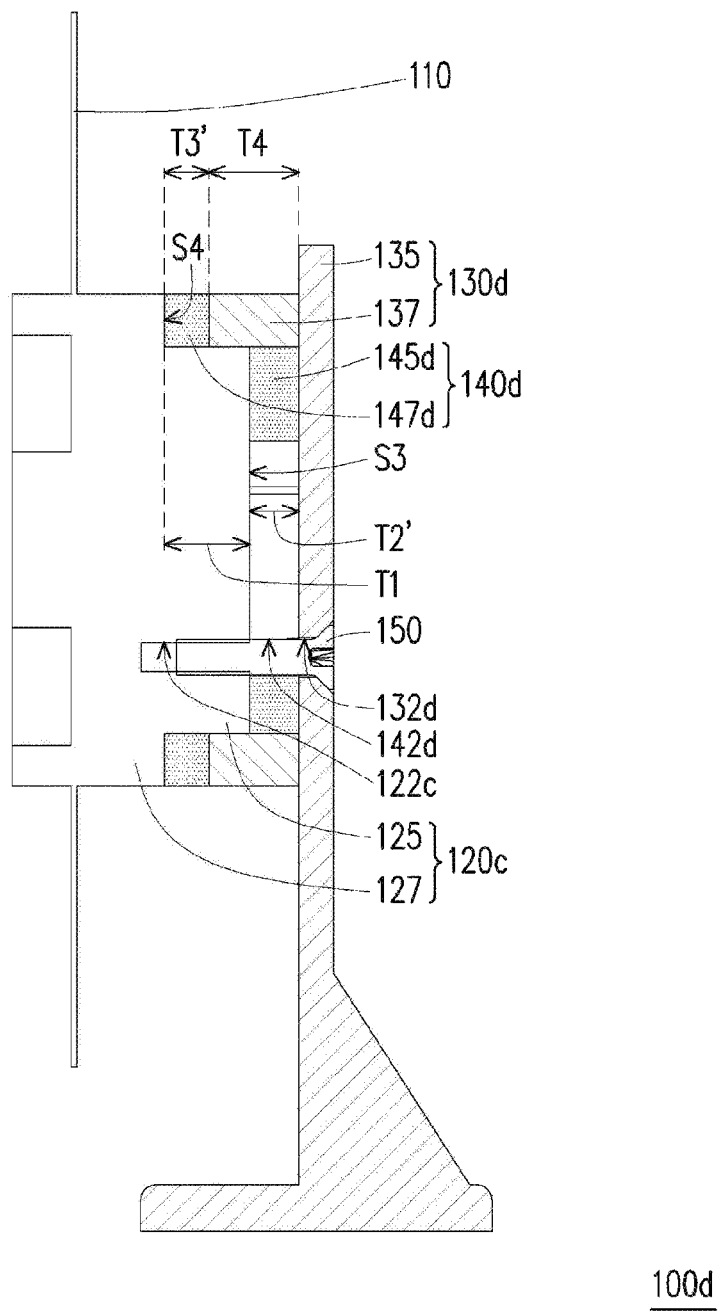
FIG. 3E is a schematic cross-sectional view of a wheel according to another embodiment of the invention.

FIG. 3A is a schematic three-dimensional view of a wheel according to another embodiment of the invention. FIG. 3B is a schematic three-dimensional exploded view of the wheel of FIG. 3A. FIG. 3C is a schematic three-dimensional exploded view of the wheel of FIG. 3A from another perspective. FIG. 3D is a schematic cross-sectional view of the wheel of FIG. 3A. FIG. 3E is a schematic cross-sectional view of a wheel according to another embodiment of the invention. Referring to FIG. 1A, FIG. 1B, FIG. 1C, FIG. 3A, FIG. 3B, and FIG. 3C at the same time, in the embodiment, a wheel 100c in FIG. 3A is similar to the wheel 100a in FIG. 1A, and a difference therebetween is that in the embodiment, structures of a driving assembly 120c and a damper 140c in FIG. 3A are different from the structures of the driving assembly 120a and the damper 140a in FIG. 1A.

In detail, in the embodiment, the driving assembly 120c includes a first portion 125 and a second portion 127 connected to each other, where the first portion 125 has a first bearing surface S3, and the second portion 127 has a second bearing surface S4. Moreover, the damper 140c of the embodiment includes a first damper 145c and a second damper 147c, where the first damper 145c and the second damper 147c are embodied in ring shapes, and are, for example, continuous ring shapes. Furthermore, the first damper 145c has a first inner diameter D4 and a first outer diameter D5. The second damper 147c has a second inner diameter D6 and a second outer diameter D7 (i.e., a second diameter), where the second inner diameter D6 is greater than or equal to the first outer diameter D5. Here, the first damper 145c and the second damper 147c are connected as a whole, i.e., the first damper 145c and the second damper 147c are seamlessly connected and integrally formed. Certainly, in other embodiments, the first damper 145c and the second damper 147c may also be independent, i.e., two pieces.

Referring to FIG. 3B and FIG. 3C, the first portion 125 of the driving assembly 120c of the embodiment has a plurality of first thread holes 122c and a center point C. A longest distance R3 and a shortest distance R4 between an edge of each first thread hole 122c and the center point C are defined. The first inner diameter D4 of the first damper 145c is greater than or equal to the shortest distance R4, and the first outer diameter D5 of the first damper 145c is greater than or equal to the longest distance R3. Furthermore, a shape of the first bearing surface S3 of the first portion 125 of the driving assembly 120c is embodied as a circular plane, and the second inner diameter D6 of the second damper 147c is greater than or equal to a diameter D8 of the first bearing surface S3. The second bearing surface S4 of the second portion 127 of the driving assembly 120c is embodied in a ring shape, and the second outer diameter D7 of the second damper 147c is greater than or equal to a diameter D9 (i.e., a first diameter) of the second bearing surface S4.

Referring to FIG. 3D, in the embodiment, the distances between the first bearing surface S3 and the second bearing surface S4 to the fixing bracket 130a are different, the first damper 145c contacts the first bearing surface S3, and the second damper 147c contacts the second bearing surface S4. A thickness of the first damper 145c has a constant value, i.e., a uniform thickness. The first portion 125 of the driving assembly 120c has a first thickness T1, the first damper 145c has a second thickness T2, and the second damper 147c has a third thickness T3. The third thickness T3 is equal to the sum of the first thickness T1 and the second thickness T2. The first damper 145c and the second damper 147c are seamlessly connected, and the first damper 145c and the second damper 147c only differ in thickness. The locking members 150 pass through the thread holes 132a, the second thread holes 142c, and the first thread holes 122c in sequence to fix the driving assembly 120c disposed on the substrate 110 and the damper 140c onto the fixing bracket 130a.

In another embodiment, referring to FIG. 3E, a fixing bracket 130d of a wheel 100d includes a main body portion 135 and a bearing portion 137 connected to the main body portion 135. Distances between the first bearing surface S3 and the second bearing surface S4 and the fixing bracket 130d of the embodiment are different. A first damper 145d contacts the first bearing surface S3, and a second damper 147d contacts the second bearing surface S4. The first portion 125 of the driving assembly 120c has a first thickness T1, the first damper 145d of the damper 140d has a second thickness T2', the second damper 147d of the damper 140d has a third thickness T3', and the bearing portion 137 of the fixing bracket 130d has a fourth thickness T4. The sum of the first thickness T1 and the second thickness T2' is equal to the sum of the third thickness T3' and the fourth thickness T4. Where, a magnitude of the third thickness T3' depends on the fourth thickness T4 of the bearing portion 137 connected to the main body portion 135 in the fixing bracket 130d, and the third thickness T3' is greater than zero. In other words, if the fourth thickness T4 is equal to zero, similar to that shown in FIG. 3D, the first damper 145d and the second damper 147d are seamlessly connected, and the first damper 145d and the second damper 147d only differ in thickness, and the third thickness T3' is equal to the sum of the first thickness T1 and the second thickness T2'. The locking members 150 sequentially pass through the thread holes 132d, the second thread holes 142d and the first thread holes 122c to fix the driving assembly 120c disposed on the substrate 110 and the damper 140d onto the fixing bracket 130d.

In brief, since the driving assembly 120c of the embodiment is composed of the first portion 125 and the second portion 127, the distances from the fixing brackets 130a, 130d to the first bearing surface S3 and the second bearing surface S4 are different, so that the structures and thicknesses of the dampers 140c and 140d are also different accordingly. Namely, the structural design of the dampers 140c, 140d may be changed according to a shape of the driving assembly 120c or the fixing bracket 130a, 130d. In the embodiment, the first dampers 145c, 145d of the dampers 140c, 140d are not overlapped with the second dampers 147c, 147d, but may be connected as one damper 140c (as shown in FIG. 3D). The second thicknesses T2, T2' of the first dampers 145c, 145d and the third thicknesses T3, T3' of the second damper 147c, 147d do not need to be the same and are both greater than zero. In addition, the first dampers 145c, 145d and the second dampers 147c, 147d may be an integral type ring-shape design or a segmental type ring-shape design, which is not limited by the invention.

Figure 4A:
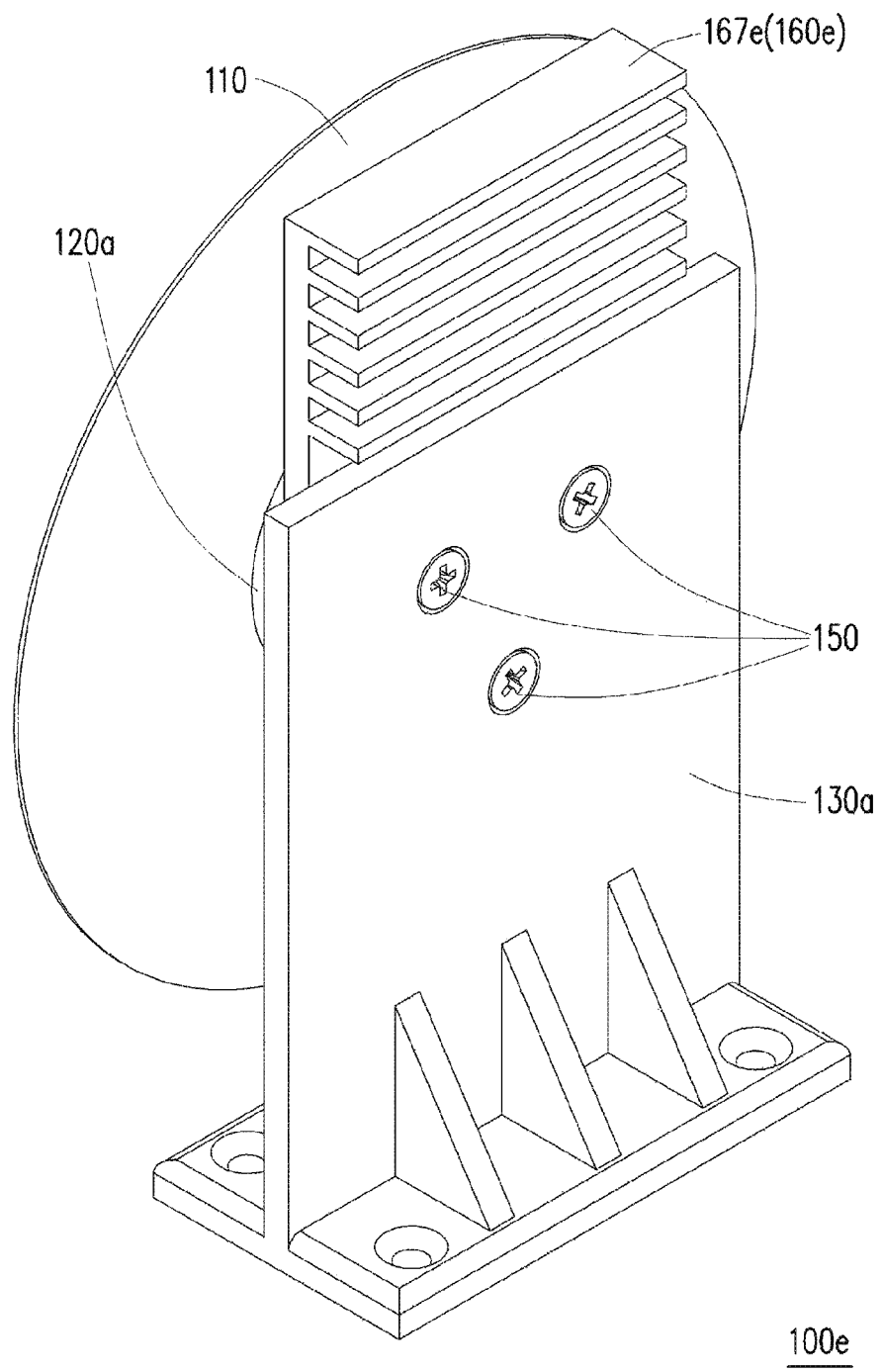
FIG. 4A is a schematic three-dimensional view of a wheel according to another embodiment of the invention.
Figure 4B:
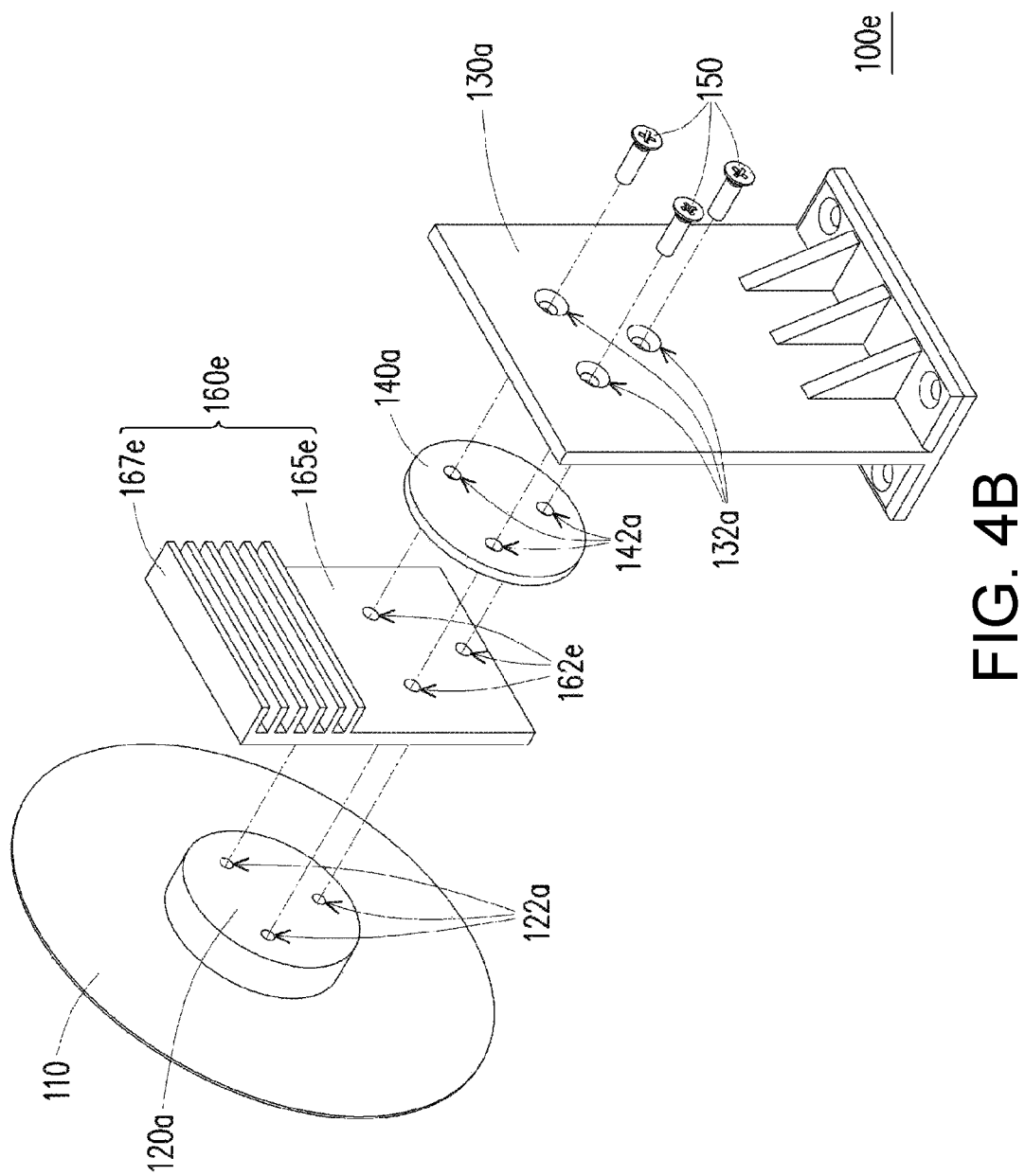
FIG. 4B is a schematic three-dimensional exploded view of the wheel of FIG. 4A.
Figure 4C:
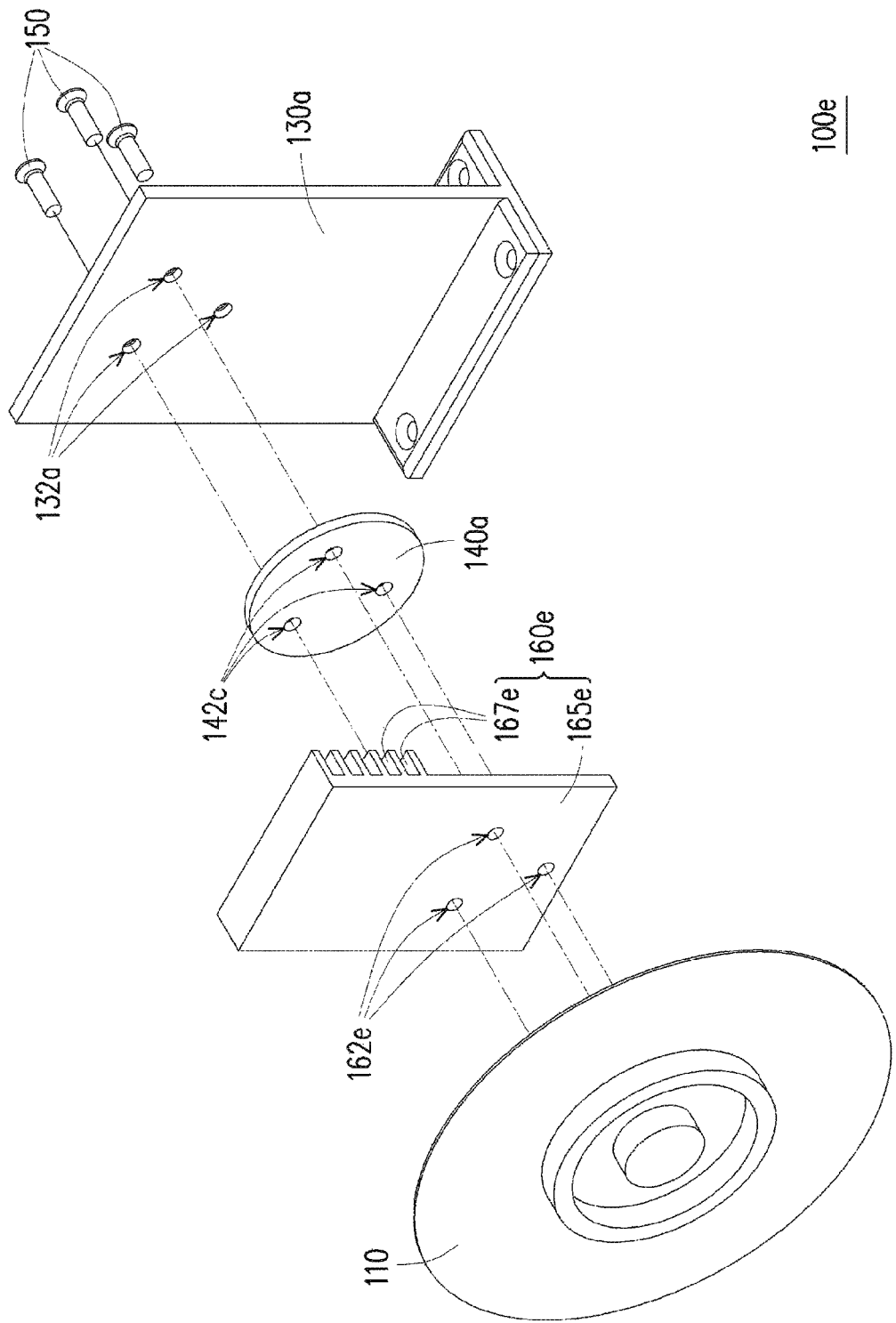
FIG. 4C is a schematic three-dimensional exploded view of the wheel of FIG. 4A from another perspective.
Figure 4D:
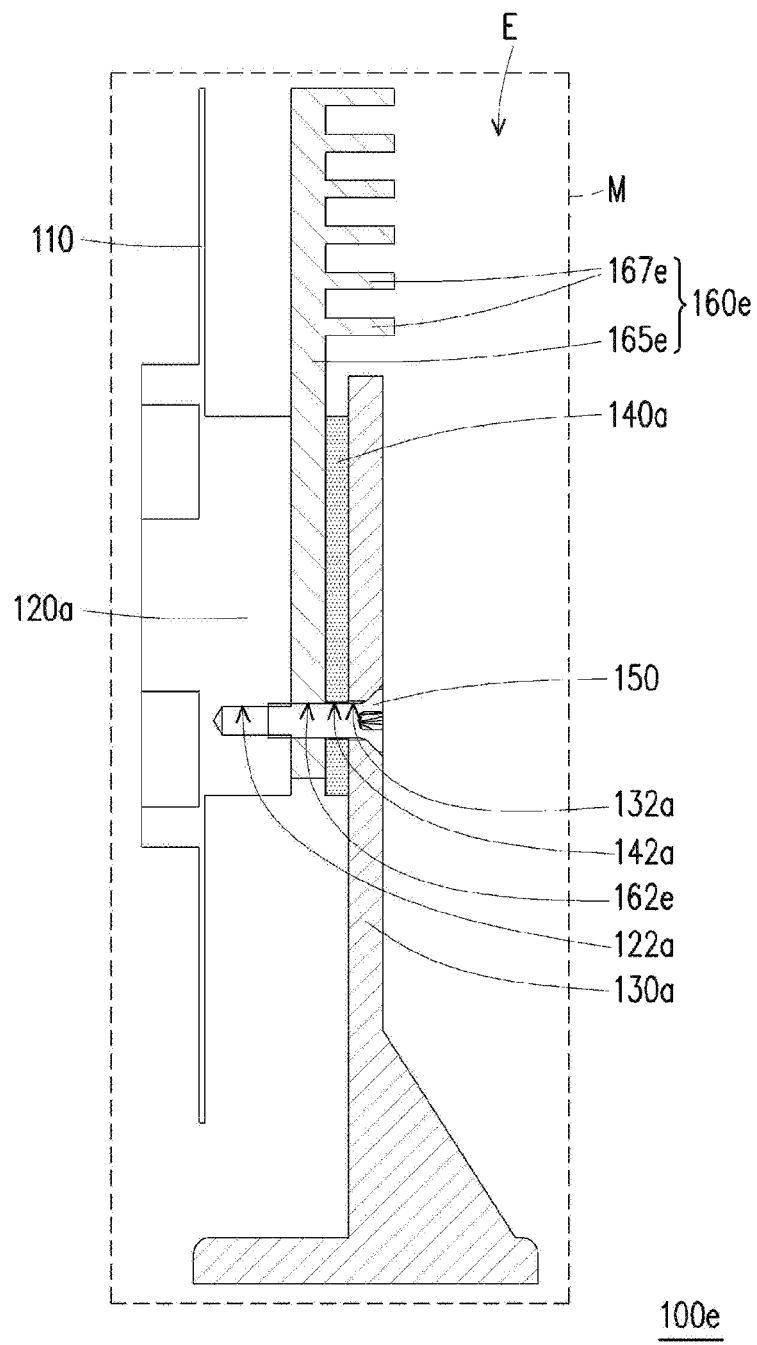
FIG. 4D is a schematic cross-sectional view of the wheel of FIG. 4A.
Figure 4E:
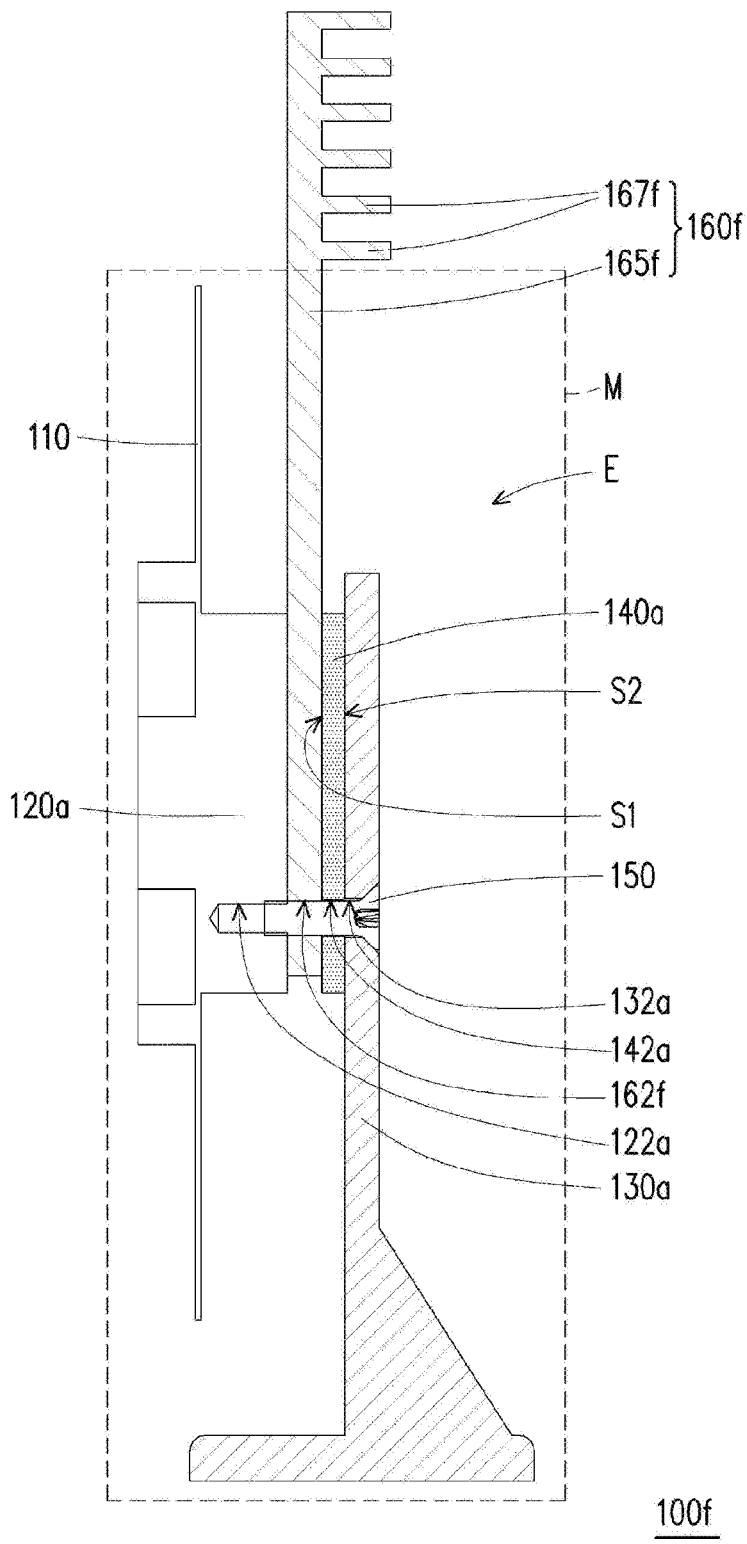
FIG. 4E is a schematic cross-sectional view of a wheel according to another embodiment of the invention.

FIG. 4A is a schematic three-dimensional view of a wheel according to another embodiment of the invention. FIG. 4B is a schematic three-dimensional exploded view of the wheel of FIG. 4A. FIG. 4C is a schematic three-dimensional exploded view of the wheel of FIG. 4A from another perspective. FIG. 4D is a schematic cross-sectional view of the wheel of FIG. 4A. FIG. 4E is a schematic cross-sectional view of a wheel according to another embodiment of the invention. Referring to FIG. 1A and FIG. 4A at the same time, in the embodiment, a wheel 100e of FIG. 4A is similar to the wheel 100a of FIG. 1A, and a difference therebetween is that in the embodiment, the wheel 100e also includes a heat dissipation module 160e, which is fixed onto the driving assembly 120a.

In detail, referring to FIG. 4A, FIG. 4B, FIG. 4C and FIG. 4D at the same time, in the embodiment, the damper 140a is located between the heat dissipation module 160e and the fixing bracket 130a. The heat dissipation module 160e includes a support plate 165e and a heat sink group 167e connected to the support plate 165e. The support plate 165e has a plurality of third thread holes 162e, and the first thread holes 122a of the driving assembly 120a, the second thread holes 142a of the damper 140a, the thread holes 132a of the fixing bracket 130a and the third thread holes 162e of the support plate 165e are correspondingly arranged, respectively. The locking members 150 pass through the thread holes 132a, the second thread holes 142a, the third thread holes 162e, and the first thread holes 122a in sequence to fix the driving assembly 120a disposed on the substrate 110, the support plate 165e of the heat dissipation module 160e, and the damper 140a onto the fixing bracket 130a. The wheel 100e is disposed in a cavity E of a light combining module M (shown in FIG. 4D), where the heat sink group 167e of the heat dissipation module 160e is located in the cavity E, which does not affect a component layout of the projector.

In another embodiment, referring to FIGS. 4D and 4E at the same time, in the embodiment, the wheel 100e of FIG. 4D is similar to a wheel 100f of FIG. 4E, and a difference therebetween is that in the embodiment, a heat sink group 167f of the heat dissipation module 160f of the wheel 100f of FIG. 4E extends outside the cavity E. In this way, a heat dissipation path of the driving assembly 120a may be increased to achieve an effect of reducing a temperature of the driving assembly 120a. The locking members 150 pass through the thread holes 132a, the second thread holes 142a, the third thread holes 162f, and the first thread holes 122a in sequence to fix the driving assembly 120a disposed on the substrate 110, the support plate 165f of the heat dissipation module 160f, and the damper 140a onto the fixing bracket 130a.

In brief, through the arrangement of the heat dissipation modules 160e and 160f, the heat generated by the driving assembly 120a may be dissipated through the heat dissipation modules 160e and 160f, so as to achieve the purpose of reducing the temperature of the driving assembly 120a.

Figure 5A:
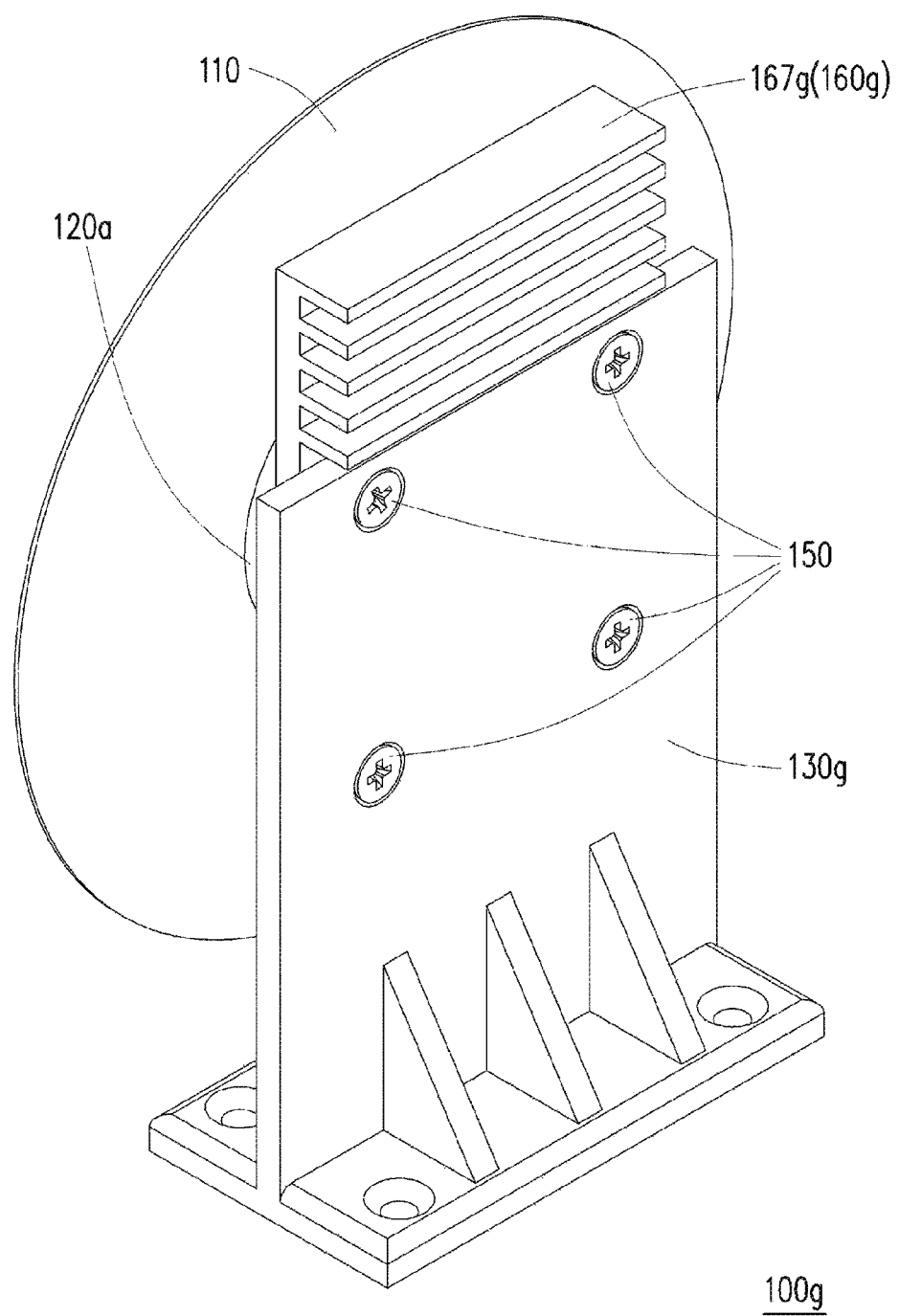
FIG. 5A is a schematic three-dimensional view of a wheel according to another embodiment of the invention.
Figure 5B:
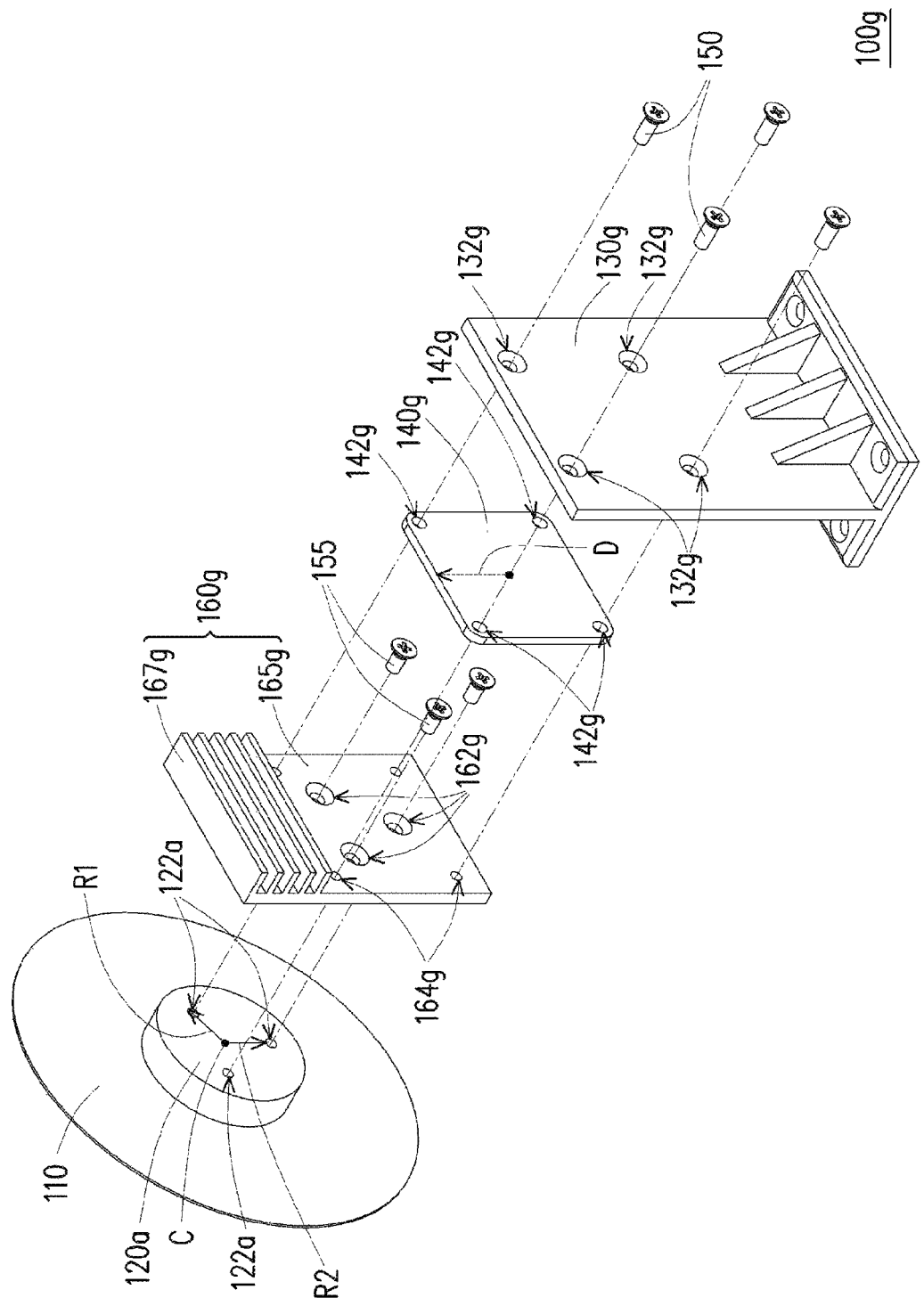
FIG. 5B is a schematic three-dimensional exploded view of the wheel of FIG. 5A.
Figure 5C:
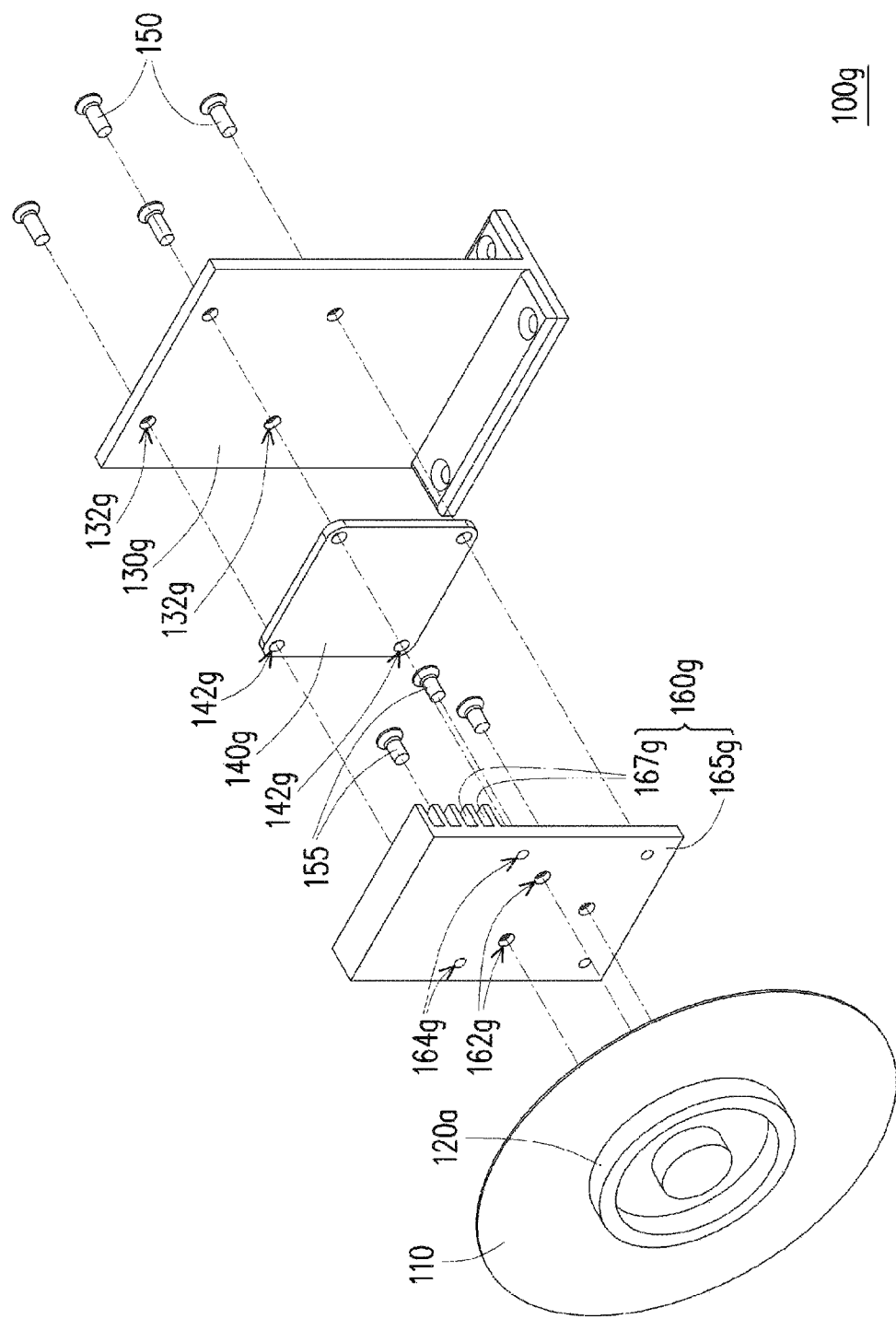
FIG. 5C is a schematic three-dimensional exploded view of the wheel of FIG. 5A from another perspective.
Figure 5D:
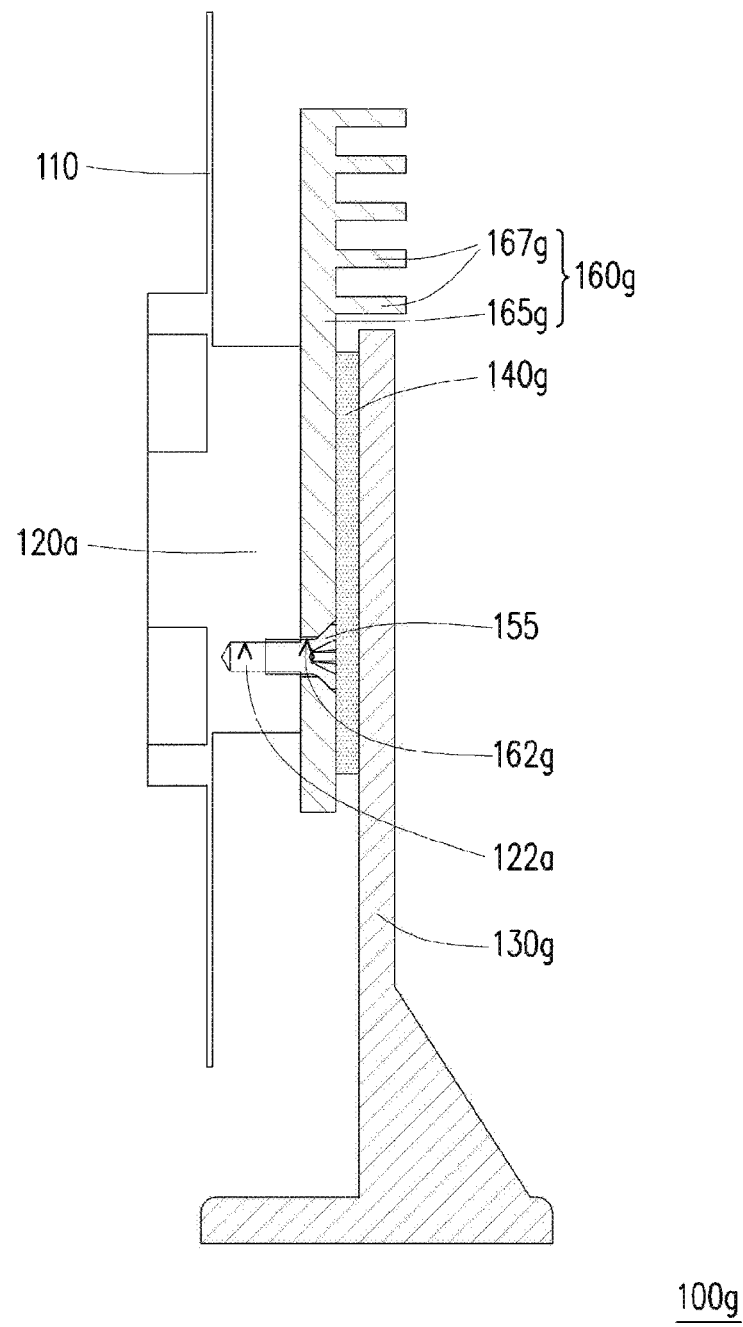
FIG. 5D is a schematic cross-sectional view of the wheel of FIG. 5A.

FIG. 5A is a schematic three-dimensional view of a wheel according to another embodiment of the invention. FIG. 5B is a schematic three-dimensional exploded view of the wheel of FIG. 5A. FIG. 5C is a schematic three-dimensional exploded view of the wheel of FIG. 5A from another perspective. FIG. 5D is a schematic cross-sectional view of the wheel of FIG. 5A. Referring to FIG. 4A, FIG. 4B, FIG. 5A and FIG. 5B at the same time, a wheel 100g of FIG. 5A of the embodiment is similar to the wheel 100e of FIG. 4A, and a difference therebetween is that in the embodiment, a shape of a damper 140g in FIG. 5B is a quadrangle, i.e., not a disk, and the arrangement of second thread holes 132g of a fixing bracket 130g does not correspond to the arrangement of the first thread holes 122a of the driving assembly 120a.

In detail, referring to FIG. 5B, FIG. 5C and FIG. 5D at the same time, in the embodiment, a heat dissipation module 160g includes a support plate 165g and a heat sink group 167g connected to the support plate 165g. The third thread holes 162g of the support plate 165g respectively correspond to the first thread holes 122a of the driving assembly 120a, where locking members 155 pass through the third thread holes 162g and the first thread holes 122a in sequence to fix the driving assembly 120a disposed on the substrate 110 onto the heat dissipation module 160g. Moreover, the support plate 165g of the embodiment further has a plurality of first thread holes 164g, the fixing bracket 130g has a plurality of second thread holes 132g, and the damper 140g has a plurality of thread holes 142g, where the second thread holes 132g, the thread holes 142g and the first thread holes 164g are correspondingly arranged, respectively. The locking members 150 pass through the second thread holes 132g, the thread holes 142g, and the first thread holes 164g in sequence to fix the support plate 165g of the heat dissipation module 160g and the driving assembly 120a locked thereon and the damper 140g onto the fixing bracket 130g.

In brief, the third thread holes 162g and the first thread holes 164g of the heat dissipation module 160g of the embodiment are located at different positions, for example, as shown in FIG. 5B, the first thread holes 164g are located outside the third thread holes 162g and the first thread holes 164g surround the third thread holes 162g, so that the heat dissipation module 160g may be respectively locked with the driving assembly 120a and the fixing bracket 130g, which may reduce the amount of vibration transmitted from the driving assembly 120a to the fixing bracket 130g, thereby reducing the noise generated by the driving assembly 120a. In addition, since the shape of the damper 140g of the embodiment is embodied as a quadrangle, preferably, the minimum outer diameter D of the damper 140g is greater than or equal to the shortest distance R2 from the center point C of the driving assembly 120a to the first thread holes 122a.

In summary, one or more embodiments of the invention have at least one of following advantages or effects. In the design of the wheel provided in one or more embodiments of the invention, the driving assembly and the damper are fixed onto the fixing bracket, and the damper is disposed between the driving assembly and the fixing bracket to reduce an amount of vibration transmitted to the fixing bracket, so as to effectively reduce the noise of the wheel during operation and increase a service life of the wheel.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wheel, comprising: a substrate, a driving assembly, a fixing bracket, and a damper, wherein
    the damper is disk-shaped;
    the driving assembly is disposed on the substrate and is configured to drive the substrate to rotate;
    the driving assembly and the damper are fixed onto the fixing bracket, wherein the damper is disposed between the driving assembly and the fixing bracket, and the driving assembly is located between the substrate and the damper;
    the driving assembly has a plurality of first thread holes, the damper has a plurality of second thread holes, and the plurality of first thread holes respectively correspond to the plurality of second thread holes; and
    the driving assembly has a first diameter, the damper has a second diameter, and the second diameter is greater than or equal to the first diameter.

2. The wheel as claimed in claim 1, further comprising:
    a heat dissipation module, fixed onto the driving assembly, wherein the damper is located between the heat dissipation module and the fixing bracket.

3. The wheel as claimed in claim 2, wherein the heat dissipation module comprises a support plate, the support plate has a plurality of third thread holes, and the plurality of first thread holes, the plurality of second thread holes, and the plurality of third thread holes are correspondingly arranged, respectively.

4. The wheel as claimed in claim 3, wherein the heat dissipation module further comprises a heat sink group, the wheel is disposed in a cavity of a light combining module, and the heat sink group is located in the cavity or extends outside the cavity.

5. A wheel, comprising: a substrate, a driving assembly, a fixing bracket, and a damper, wherein
    a shape of the damper is a continuous ring shape or a discontinuous ring shape;
    the driving assembly is disposed on the substrate and is configured to drive the substrate to rotate;
    the driving assembly and the damper are fixed onto the fixing bracket, wherein the damper is disposed between the driving assembly and the fixing bracket, and the driving assembly is located between the substrate and the damper;
    the driving assembly has a first diameter, the damper has a second diameter, and the second diameter is greater than or equal to the first diameter; and
    wherein the driving assembly has a plurality of thread holes and a center point, a longest distance and a shortest distance between an edge of each of the plurality of first thread holes and the center point are defined, the damper has an inner diameter and an outer diameter, the second diameter is the outer diameter, the inner diameter is greater than or equal to the shortest distance, and the outer diameter is greater than or equal to the longest distance.

6. The wheel as claimed in claim 5, wherein a thickness of the damper has a constant value.

7. The wheel as claimed in claim 6, wherein a first contact surface of the driving assembly and the damper is parallel to a second contact surface of the damper and the fixing bracket.

8. The wheel as claimed in claim 5, further comprising:
    a heat dissipation module, fixed onto the driving assembly, wherein the damper is located between the heat dissipation module and the fixing bracket.

9. The wheel as claimed in claim 8, wherein the heat dissipation module comprises a support plate, the support plate has a plurality of first thread holes, the fixing bracket has a plurality of second thread holes, and the plurality of first thread holes respectively correspond to the plurality of second thread holes.

10. The wheel as claimed in claim 9, wherein the heat dissipation module further comprises a heat sink group, the wheel is disposed in a cavity of a light combining module, and the heat sink group is located in the cavity or extends outside the cavity.

11. A wheel, comprising: a substrate, a driving assembly, a fixing bracket, and a damper, wherein
    a shape of the damper is a continuous ring shape or a discontinuous ring shape;
    the driving assembly is disposed on the substrate and is configured to drive the substrate to rotate;
    the driving assembly and the damper are fixed onto the fixing bracket, wherein the damper is disposed between the driving assembly and the fixing bracket, and the driving assembly is located between the substrate and the damper;

the driving assembly has a first diameter, the damper has a second diameter, and the second diameter is greater than or equal to the first diameter; and wherein the driving assembly comprises a first portion and a second portion, the first portion has a first bearing surface, the second portion has a second bearing surface, the damper comprises a first damper and a second damper, the first damper has a first inner diameter and a first outer diameter, the second damper has a second inner diameter and a second outer diameter, the second diameter is the second outer diameter, the second inner diameter is greater than or equal to the first outer diameter, the first damper contacts the first bearing surface, and the second damper contacts the second bearing surface.

12. The wheel as claimed in claim 11, wherein the first damper and the second damper are independent or connected as a whole.

13. The wheel as claimed in claim 11, wherein the first portion of the driving assembly has a plurality of thread holes and a center point, a longest distance and a shortest distance between an edge of each of the plurality of thread holes and the center point are defined, the first inner diameter is greater than or equal to the shortest distance, and the first outer diameter is greater than or equal to the longest distance.

14. The wheel as claimed in claim 11, wherein the first bearing surface of the first portion is a circular plane, the second bearing surface of the second portion has a ring shape, the second inner diameter is greater than or equal to a diameter of the first bearing surface, the second outer diameter is greater than or equal to a diameter of the second bearing surface, and the first diameter is the diameter of the second bearing surface.

15. The wheel as claimed in claim 14, wherein a thickness of the first damper has a constant value.

16. The wheel as claimed in claim 15, wherein the first portion of the driving assembly has a first thickness, the first damper has a second thickness, the second damper has a third thickness, the fixing bracket comprises a main body portion and a bearing portion connected to the main body portion, the bearing portion has a fourth thickness, and a sum of the first thickness and the second thickness is equal to a sum of the third thickness and the fourth thickness.

17. The wheel as claimed in claim 11, wherein the first damper and the second damper are seamlessly connected.

* * * * *